United States Patent
Aggarwal

(10) Patent No.: US 12,417,607 B2
(45) Date of Patent: Sep. 16, 2025

(54) DYNAMIC IMAGE SEARCH BASED ON USER-SELECTED OBJECTS

(71) Applicant: Microsoft Technology Licensing, LLC, Redmond, WA (US)

(72) Inventor: Rishu Aggarwal, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 18/074,991

(22) Filed: Dec. 5, 2022

(65) Prior Publication Data
US 2024/0185551 A1 Jun. 6, 2024

(51) Int. Cl.
| | |
|---|---|
| *G06F 16/532* | (2019.01) |
| *G06T 3/20* | (2006.01) |
| *G06T 11/00* | (2006.01) |
| *G06V 10/22* | (2022.01) |
| *G06V 10/44* | (2022.01) |
| *G06V 10/74* | (2022.01) |
| *G06V 10/774* | (2022.01) |
| *G06F 3/0346* | (2013.01) |
| *G06F 3/0488* | (2022.01) |

(52) U.S. Cl.
CPC .......... *G06V 10/235* (2022.01); *G06F 16/532* (2019.01); *G06T 3/20* (2013.01); *G06T 11/00* (2013.01); *G06V 10/44* (2022.01); *G06V 10/761* (2022.01); *G06V 10/774* (2022.01); *G06F 3/0346* (2013.01); *G06F 3/0488* (2013.01); *G06T 2200/24* (2013.01)

(58) Field of Classification Search
CPC .... G06V 10/235; G06V 10/44; G06V 10/761; G06V 10/774; G06F 16/532; G06F 3/0346; G06F 3/0488; G06F 16/583; G06F 16/51; G06T 3/20; G06T 11/00; G06T 2200/24
See application file for complete search history.

(56) References Cited

U.S. PATENT DOCUMENTS

| | | | |
|---|---|---|---|
| 2018/0137892 A1* | 5/2018 | Ding | G11B 27/031 |
| 2021/0319228 A1* | 10/2021 | Fleischman | G06F 16/783 |

OTHER PUBLICATIONS

International Search Report and Written Opinion received for PCT Application No. PCT/US23/035558, mailed on Jan. 23, 2024, 12 pages.
Kuznetsova et al., "The Open Images Dataset V4: Unified Image Classification, Object Detection, and Visual Relationship Detection at Scale", Computer Vision and Pattern Recognition, Nov. 2, 2018, 26 pages.
Ravi, et al., "Buy Me That Look: An Approach for Recommending Similar Fashion Products", Arxiv, Aug. 26, 2020, 9 pages.
Redmon, et al., "You Only Look Once: Unified, Real-Time Object Detection," arXiv, Cornell University, arXiv:1506.02640v5 [cs. CV], May 9, 2016, 10 pages.

(Continued)

*Primary Examiner* — Chong Wu
(74) *Attorney, Agent, or Firm* — Rainier Patents, P.S.

(57) ABSTRACT

This document relates to searching for images using a query image. For example, an input image can be received and analyzed to identify objects, and then identification of two or more selected objects can be received. A query image can be derived from the input image, where the query image includes the selected objects. The query image can be used to perform a search to identify related images, which can be output in response to the query image.

21 Claims, 17 Drawing Sheets

(56) References Cited

OTHER PUBLICATIONS

Ren et al., "Faster R-CNN: Towards Real-Time Object Detection with Region Proposal Networks", Computer Vision and Pattern Recognition (cs.CV), Jun. 4, 2015, 14 pages.

International Preliminary Report On Patentability received for PCT Application No. PCT/US23/035558, mailed on Jun. 19, 2025, 07 pages.

* cited by examiner

DYNAMIC IMAGE SEARCH BASED ON USER-SELECTED OBJECTS

BACKGROUND

Conventional search engines allow users to search for images using another image as a search query. For example, a user can upload an image to the search engine as a query image, and then the search engine identifies image search results that are similar to the entirety of the received query image. However, in some cases, users may be interested in specific parts of a given image rather than the entirety of the image, and conventional image search techniques have certain limitations in this regard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for searching for images. One example includes a method or technique that can be performed on a computing device. The method or technique can include identifying an input image and detecting a plurality of objects in the input image. The method or technique can also include receiving input identifying two or more selected objects from the input image and deriving a query image from the input image. The query image can include the two or more selected objects. The method or technique can also include performing a search to identify result images based at least on similarity to the query image, and outputting the result images in response to the query image.

Another example includes a method or technique that can be performed on a computing device. The method or technique can include identifying an input image and detecting a plurality of objects in the input image. The method or technique can also include receiving input identifying a first selected object from the input image and a second selected object from the input image. The method or technique can also include adjusting relative positioning of the first selected object and the second selected object, where the adjusting results in a query image. The method or technique can also include performing a search using the query to identify result images based at least on similarity to the query image, and outputting the result images in response to the query image.

Another example includes a system that includes a hardware processing unit and a storage resource. The storage resource can store computer-readable instructions which, when executed by the hardware processing unit, cause the system to implement a search engine. The search engine can be configured to maintain an index of searchable images. The search engine can also be configured to receive identification of two or more selected objects from an input image and generate a query image from the input image. The query image can include the two or more selected objects. The search engine can also be configured to search the index based at least on the query image to identify result images, and to output the result images in response to the query image.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
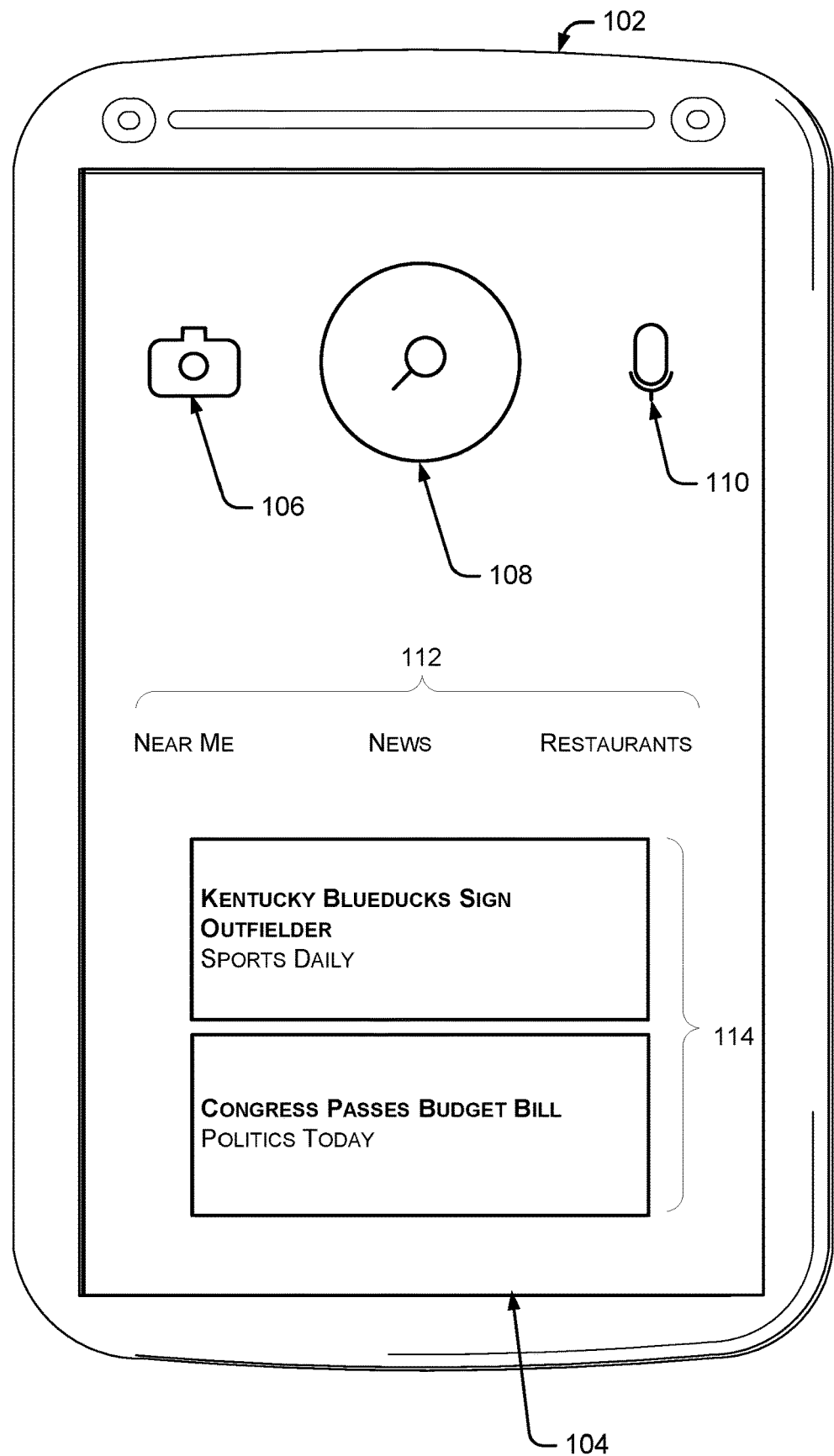
FIGS. 1-3, 4A-4C, 6-8, 10, and 11 illustrate examples of graphical user interfaces that are consistent with some implementations of the present concepts.

As noted above, one way for a user to search for images is to submit an input image to a search engine. The search engine can use the entirety of the input image as a search query to retrieve other images that are visually similar to the input image, and the search engine can then return the retrieved images as image search results. However, in some cases, users may be interested in specific objects within a given image rather than the entirety of the image, and conventional image search techniques do not readily accommodate these scenarios.

For instance, one way for a user to search for images that are similar to part of an input image is to modify the input image before submitting the input image to a search engine. As one example, a user could manually crop out part of an image using a snipping tool or other tool for manipulating images. However, it can be difficult for users to accurately crop out specific parts of an image that interest them. As a consequence, a search performed using a manually-cropped image may tend to return result images that do not accurately match the user's search intent.

In addition, many images have objects that are partially obscured by other objects in the images. This, in turn, can make it even more difficult for users to manually select specific portions of a given image to use for a subsequent image search. In still further cases, users may be interested in physical relationships between objects in a given image that are not necessarily present in the original image. For instance, a user might have an image of a jockey standing a few feet away from a horse, and wish to retrieve images of jockeys riding horses. Conventional techniques do not readily allow users to modify such an image so that it can be used to retrieve images of jockeys riding horses.

The implementations set forth herein can allow users to select a subset of objects from an input image to generate a query image that includes the subset of selected objects, but excludes one or more other objects from the input image. Then, the query image can be used to search for similar images. Thus, the user can be provided with search results that are focused on the objects of interest to the user, rather than on other objects in the input image that the user may not be interested in.

In addition, the disclosed implementations offer users the ability to rearrange objects manually or to have the objects automatically rearranged in an input image. For instance, two objects that are physically distant from one another in the input image can be moved relatively closer to one another to obtain a query image. As a consequence, the query image can be used to obtain image search results that have similar objects in close proximity to one another, whereas using the original input image would likely have resulted in search results where the two objects are also physically distant from one another.

Machine Learning Background

There are various types of machine learning frameworks that can be trained to perform a given task, such as detecting an object in an image, segmenting an object from a background of the image, mapping an image to an embedding, etc. Support vector machines, decision trees, and neural networks are just a few examples of machine learning frameworks that have been used in a wide variety of applications, such as image processing and natural language processing. Some machine learning frameworks, such as neural networks, use layers of operations or "nodes" that are connected together by one or more edges.

In a neural network, nodes are connected to one another via one or more edges. A neural network can include an input layer, an output layer, and one or more intermediate layers. Individual nodes in each layer can perform specific operations on their inputs, such as convolution operations, matrix operations, pooling operations, or activation function operations. Each operation can provide an output to a subsequent layer, or, in some cases, a previous layer. The inputs to a given node can be multiplied by corresponding weight values for an edge between the input and the node. In addition, nodes can have individual bias values that are also used to produce outputs. Various training procedures can be applied to learn the edge weights and/or bias values.

Neural networks and other machine learning models can be viewed as operating in two phases—training and inference. In the training phase, the model is used to make predictions given training data and the model parameters are updated based on whether those predictions are correct. In the inference phase, the trained model is employed to process input data to perform a particular task, often without further modification to the model parameters. Training can involve algorithms such as batch gradient descent that perform calculations of an error gradient to update the model parameters. In contrast, inference generally does not involve such calculations.

One way to train a machine learning model involves supervised learning. In supervised learning, a model is trained using labeled training examples, and parameters of the model are updated based on a loss function defined over the labels. Another way to train a machine learning model involves unsupervised learning, where a model can be trained to learn properties of a data set of unlabeled training examples. Training can also involve multiple stages, such as pretraining a model on a generic set of training examples and then tuning the model to an application-specific task using a task-specific set of training examples.

Definitions

For the purposes of this document, the term "input image" refers to an image that is selected as the initial basis for a search. The term "object" refers to an entity within a given image, e.g., an inanimate object, a plant, a human, an animal, etc. In some cases, an object is fully visible within a given input image, and in other cases, is partially obscured by one or more other objects in the input image. The term "object mask" refers to an image that has been modified to remove or manipulate some part of the image, e.g., by setting values surrounding a selected object to a particular value (e.g., to be invisible) while retaining the portion of the image having the selected object. A "composite image" can be generated from object masks for two or more selected objects and used as a query image to search for other images that are visually similar to the query image. Note that the term "image" is used broadly herein to refer to any type of visual content, including both still images (pictures) as well as video.

The term "query image" refers to an image that is used as the basis for a search to identify one or more result images. In some cases, as described more below, a query image can be derived from an input image. For instance, the query image can include part or all of one or more objects selected by a user while omitting part or all of one or more other objects that are not selected by the user. The term "searchable image" refers to any image that can be searched using a query image, and the term "result image" refers to any image returned as a result in response to a search performed using a query image.

The term "embedding" refers to a representation of a data item, such as an image, in a vector space. For instance, an embedding can be a binary vector of a specified length, where embeddings representing different images can be compared to one another by determining their respective distances from each other in the vector space. Generally speaking, the embeddings can be generated so that two images that are visually similar will tend to have embeddings that are in close proximity to one another in the vector space, and so that two images that are visually dissimilar will tend to have embeddings that are relatively far apart from one another in the vector space.

The term "index" refers to a data structure used to facilitate searching for a given data item, such as an image. In some cases, an index for searching images can map embeddings of the searchable images to respective searchable images themselves. The embeddings for an index can be generated by applying a model that maps each searchable image to a corresponding image embedding.

The term "model" is used generally herein to refer to a range of processing techniques, and includes models trained using machine learning as well as hand-coded (e.g., heuristic-based) models. For instance, as noted above, a machine-learning model could be a neural network, a support vector machine, a decision tree, etc. Models can be employed for various purposes as described more below, such as object identification, object segmentation, object repositioning, and/or mapping of images to respective embeddings in a vector space. Note that the term "fashion model" is used herein to refer to a human being rather than a model that can be executed on a computer.

First Example User Experience

FIG. 1 illustrates an example client device 102 displaying a search interface 104. In this example, the search interface can be an interface for a local search application that allows users to query a remote search engine, as discussed more below. Note that the disclosed techniques can readily be employed using a web browser to access the search engine instead of a local search application.

The search interface can have a camera icon 106, a text search icon 108, a microphone icon 110, a search type section 112, and a news feed section 114. Camera icon 106 can allow a user to select a photo to submit to the search engine as an input image. Text search icon 108 can allow a user to enter a text query for submission to the search engine. Microphone icon 110 can allow the user to enter a voice message to submit to the search engine. Search type section 112 includes various additional icons that can allow users to search for specific types of information instead of more general search queries. News feed section 114 provides instant access to breaking news stories.

By selecting camera icon 106, the user can identify an image to upload to the search engine as a query. For example, the user may be taken to a camera application to take a picture with a camera of the client device, and the image can be uploaded to the search engine. In other implementations, the user can select an input image from a personal camera roll stored on the client device, or the input image can be accessed remotely via a webpage such as a list of other images provided by the search engine (e.g., results of a previous search).

Figure 2:
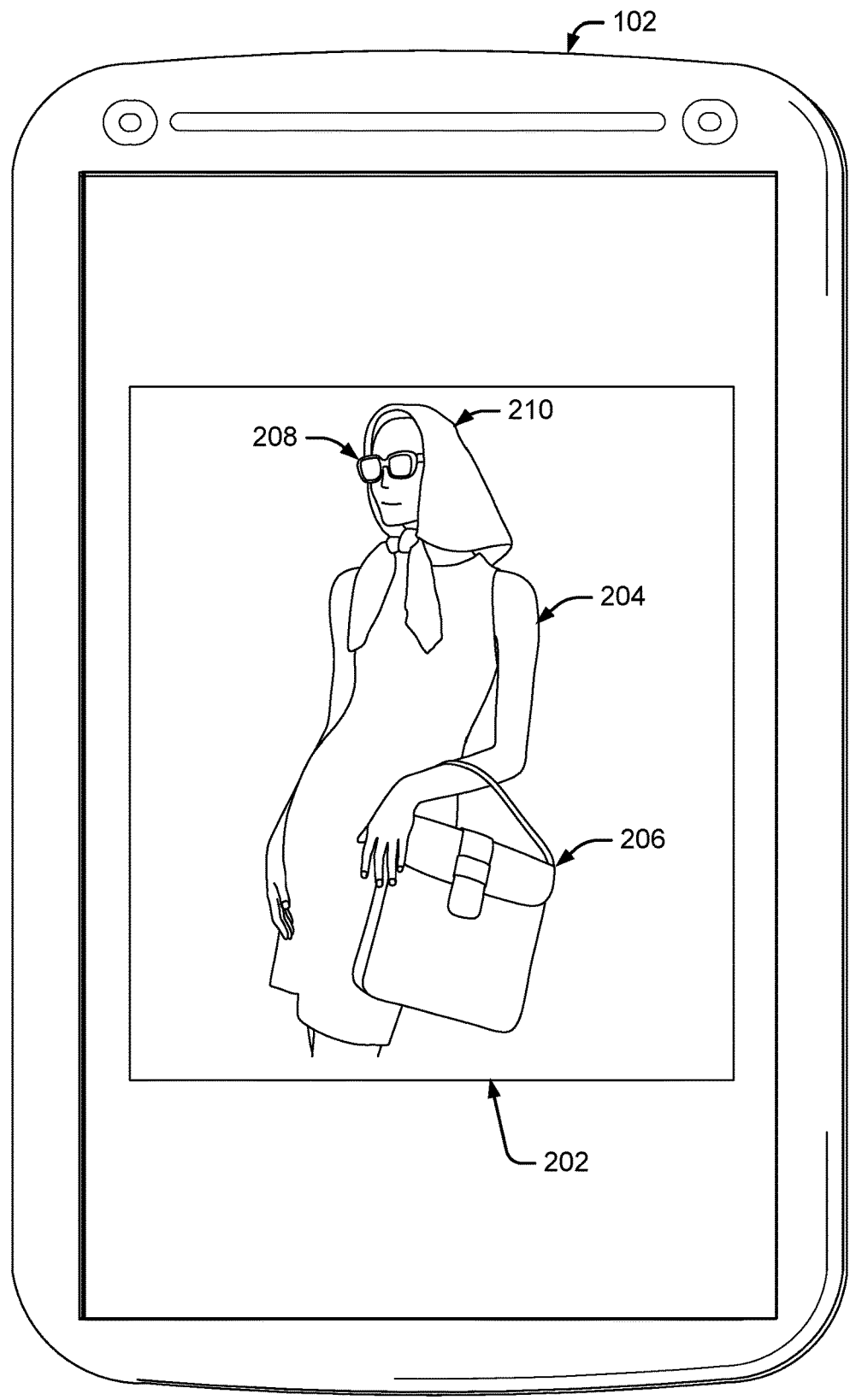

Assume the user selects an input image 202, as shown in FIG. 2. Input image 202 includes a fashion model 204 holding a handbag 206 and wearing glasses 208 and a scarf 210. For the purposes of this example, assume that the user is not necessarily interested in the handbag, but wants to see similar images of fashion models wearing glasses and scarves. However, the user may not be able to readily remove the handbag from the input image, so the user proceeds using the entire input image to query the search engine.

Figure 3:
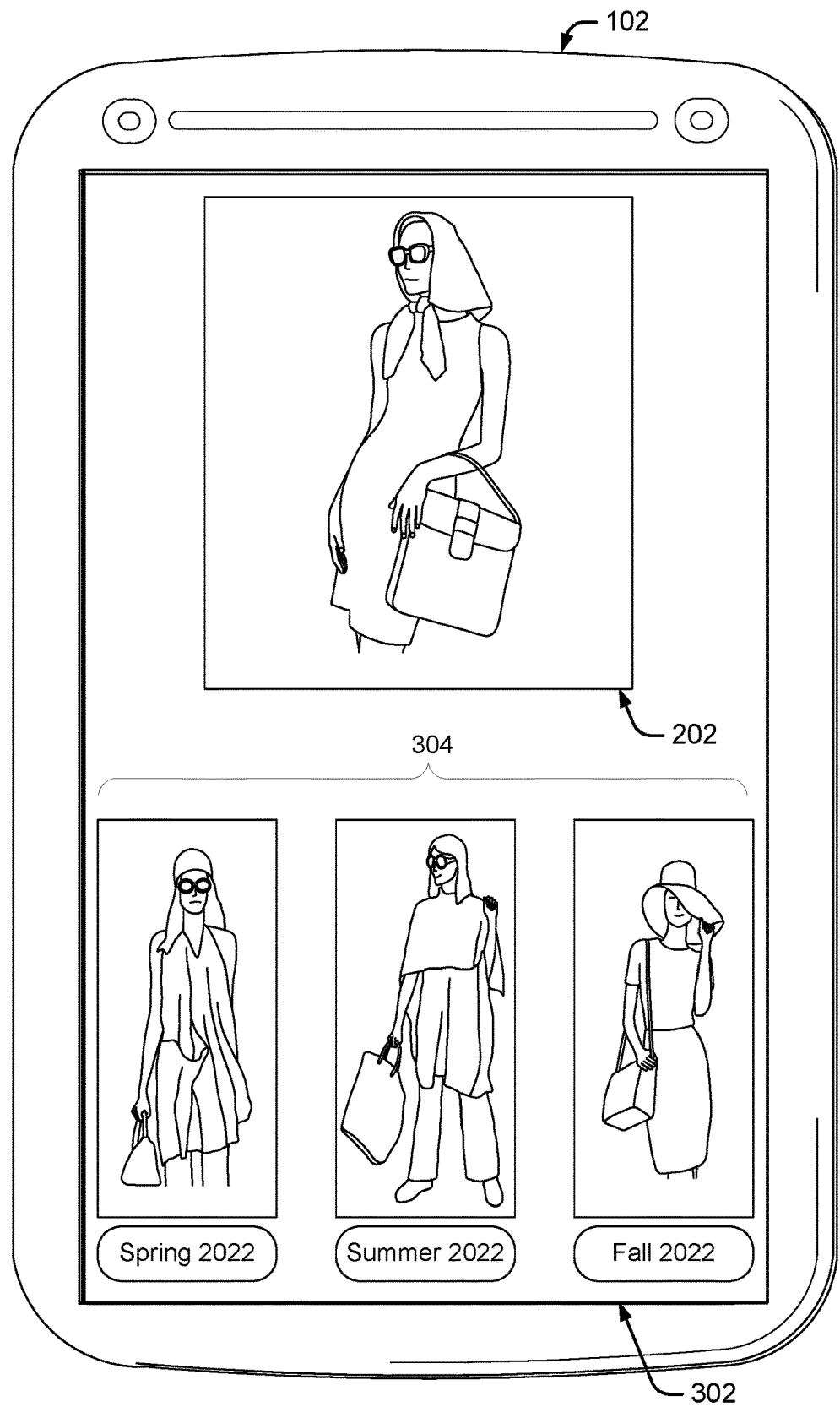

Next, the search engine may perform a search of an index of searchable images using the entire input image as a query image. The search engine can obtain image search results and send the image search results to the client device 102 over a network. The local search application can show a search results interface 302 with the image search results 304, as shown in FIG. 3. Note that each of the search results includes a fashion model carrying a handbag. However, not all of the search results include fashion models wearing scarves or glasses. Thus, the search results are not necessarily focused on the objects of interest to the user, tending to emphasize the handbag while placing relatively less emphasis on the scarf and glasses. This is a consequence of using the entirety of the input image to query the search engine.

Figure 4A:
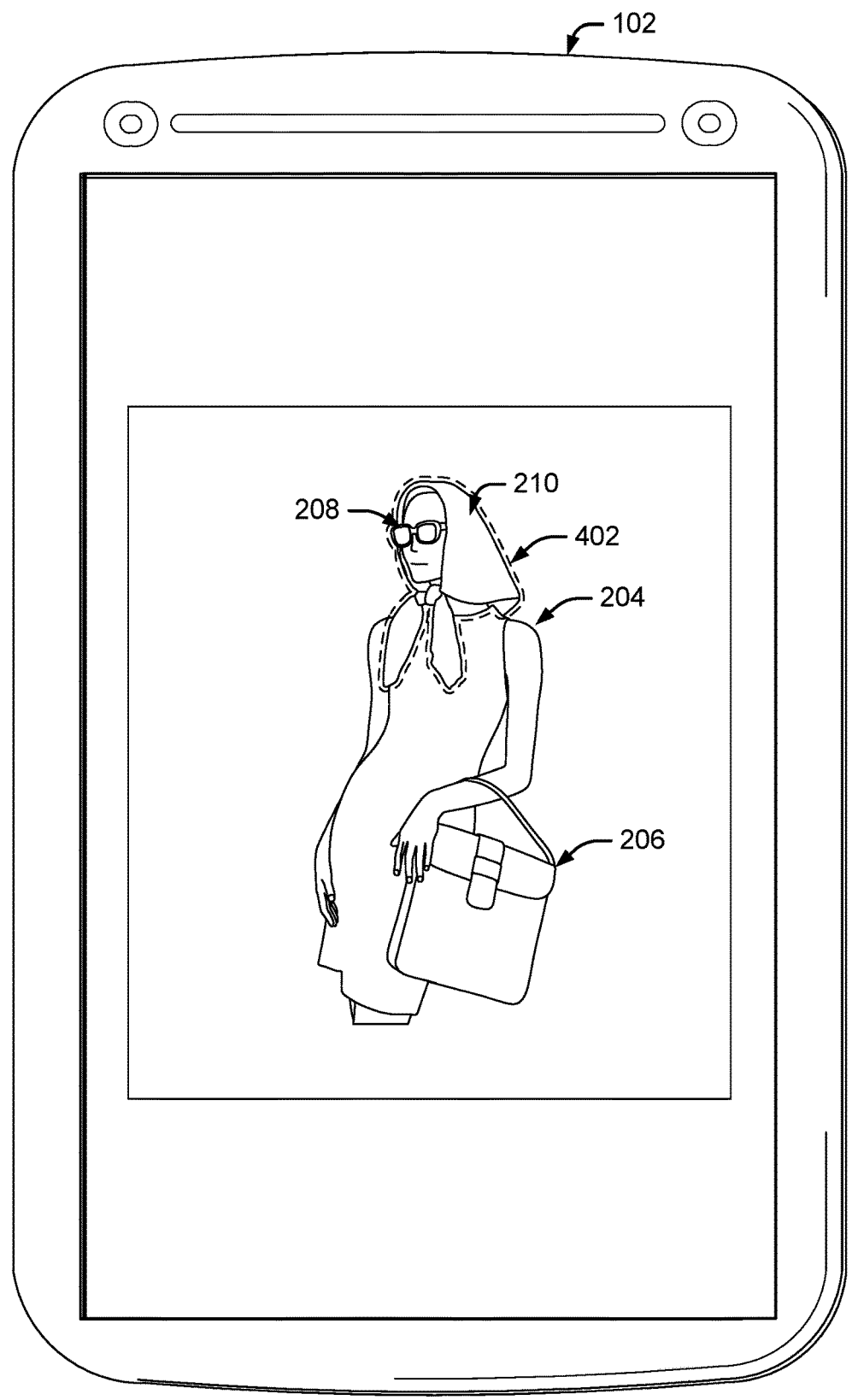
Figure 4B:
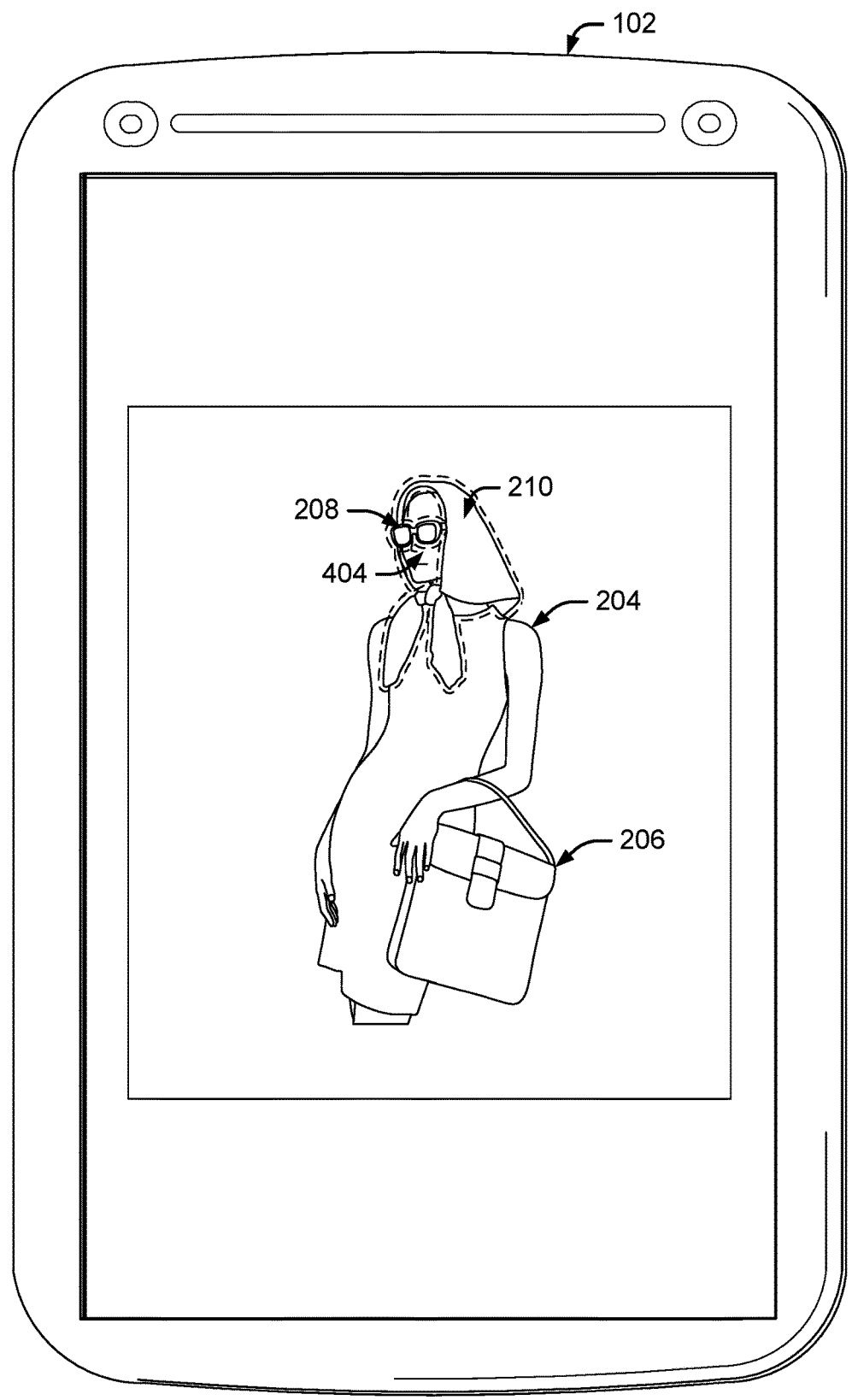
Figure 4C:
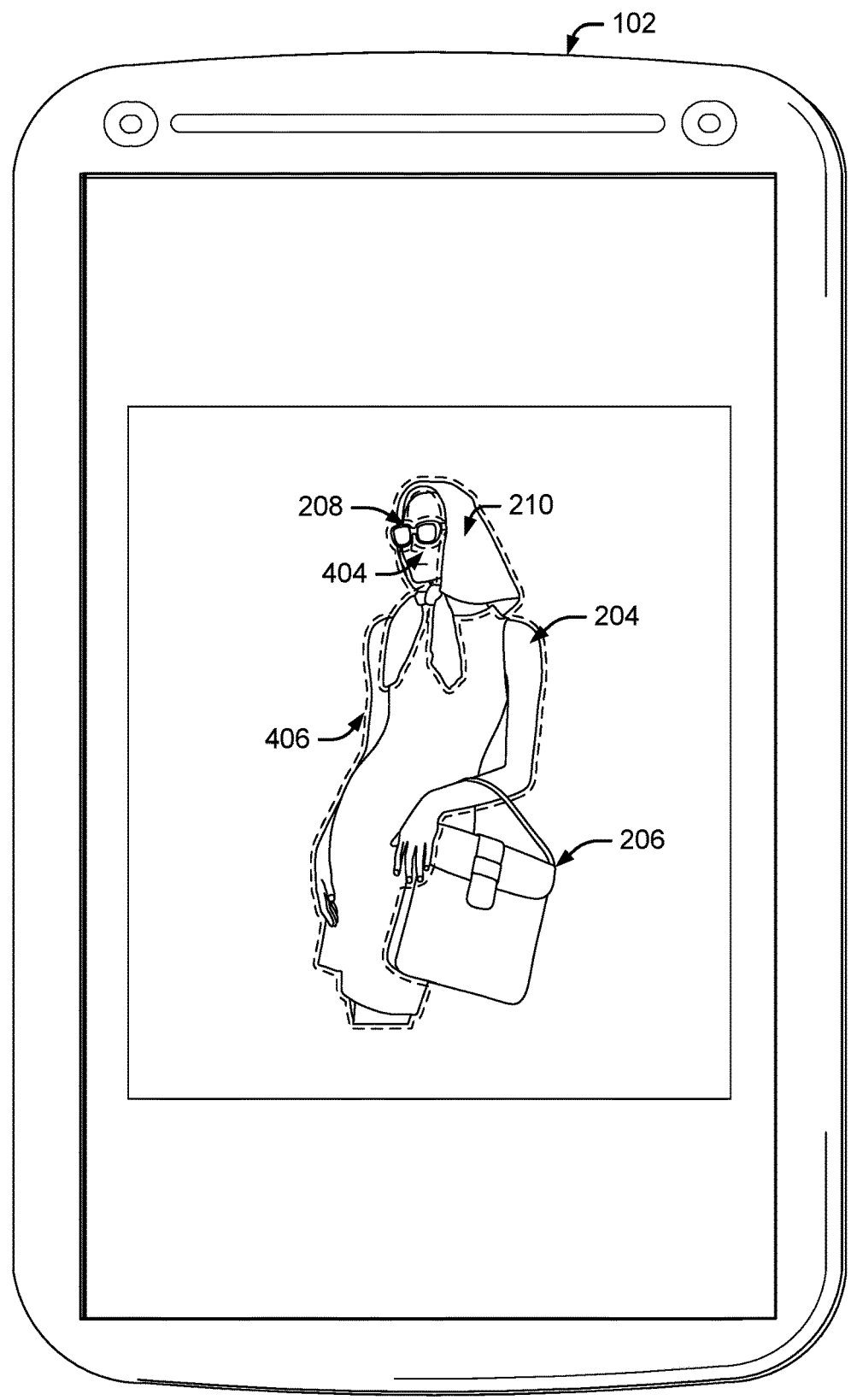

FIGS. 4A-4C show an example where a user is provided the opportunity to select a subset of the objects in the input image prior to conducting the search. First, the search engine detects the objects in the input image along with their respective boundaries, using a model such as a neural network. Next, the boundaries of each object in the image can be displayed by the local search application when the user hovers over each respective object. In some implementations, the search engine can send identifiers of each detected object and boundaries thereof to the local search application, which can render the boundaries responsive to user input as described below.

For instance, referring to FIG. 4A, assume the user hovers (e.g., using a mouse) over the scarf 210. A scarf boundary 402 can be displayed to the user temporarily while the user hovers over the scarf. If the user selects the scarf (e.g., via a mouse click, tap, etc.), the scarf boundary can be retained after the hover input moves to another object, to indicate that the scarf has been selected. Next, referring to FIG. 4B, assume the user hovers over and selects glasses 208, as shown by glasses boundary 404. Next, referring to FIG. 4C, assume the user hovers over and selects fashion model 204, as shown by fashion model boundary 406. At this point, the user has selected the fashion model 204, glasses 208, and scarf 210, but not the handbag 206, shown in FIG. 4C.

Figure 5:
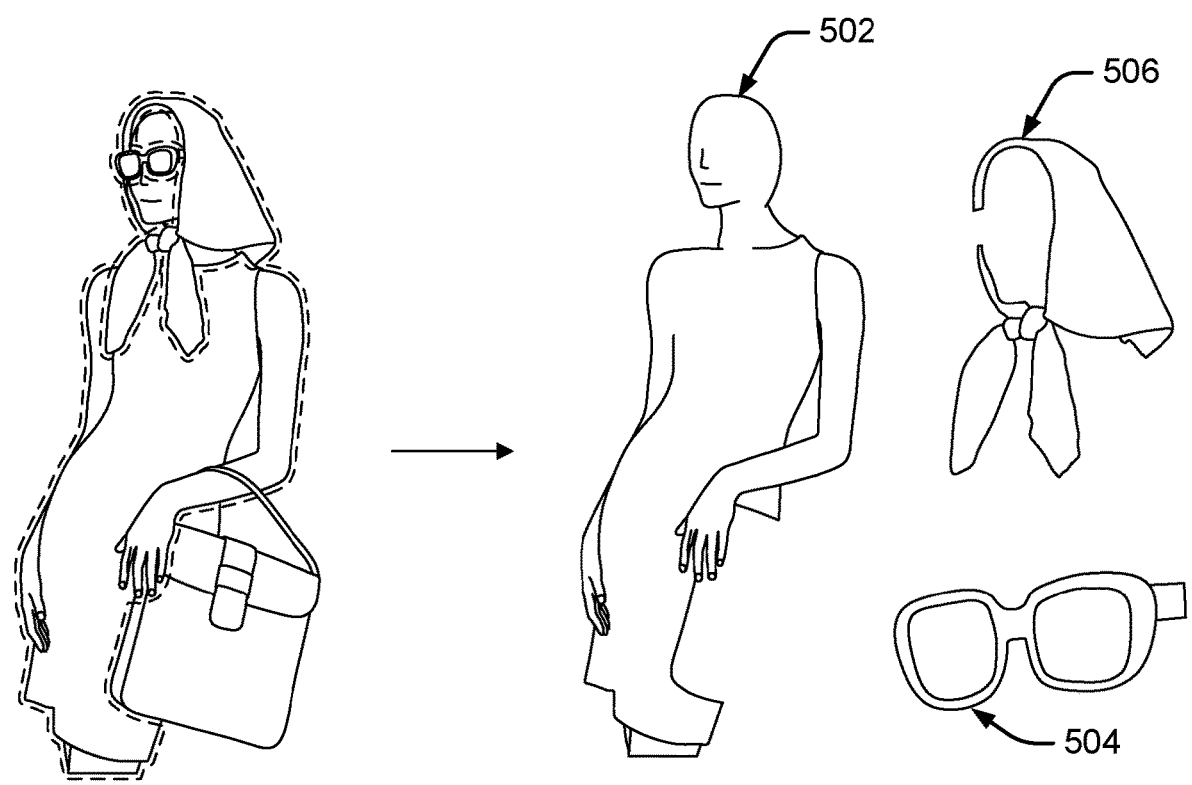
FIGS. 5 and 9 illustrate examples of object masks that can be used to derive a query image from an input image, consistent with some implementations of the present concepts.

The local search application can send identifiers of the selected objects back to the search engine, which can create masks for each selected object. For instance, as shown in FIG. 5, the selected objects are masked to create a first mask 502 of the fashion model, a second mask 504 of the glasses, and a third mask 506 of the scarf. The masks can be employed to obtain a composite query image that can be used to conduct a search.

Figure 6:
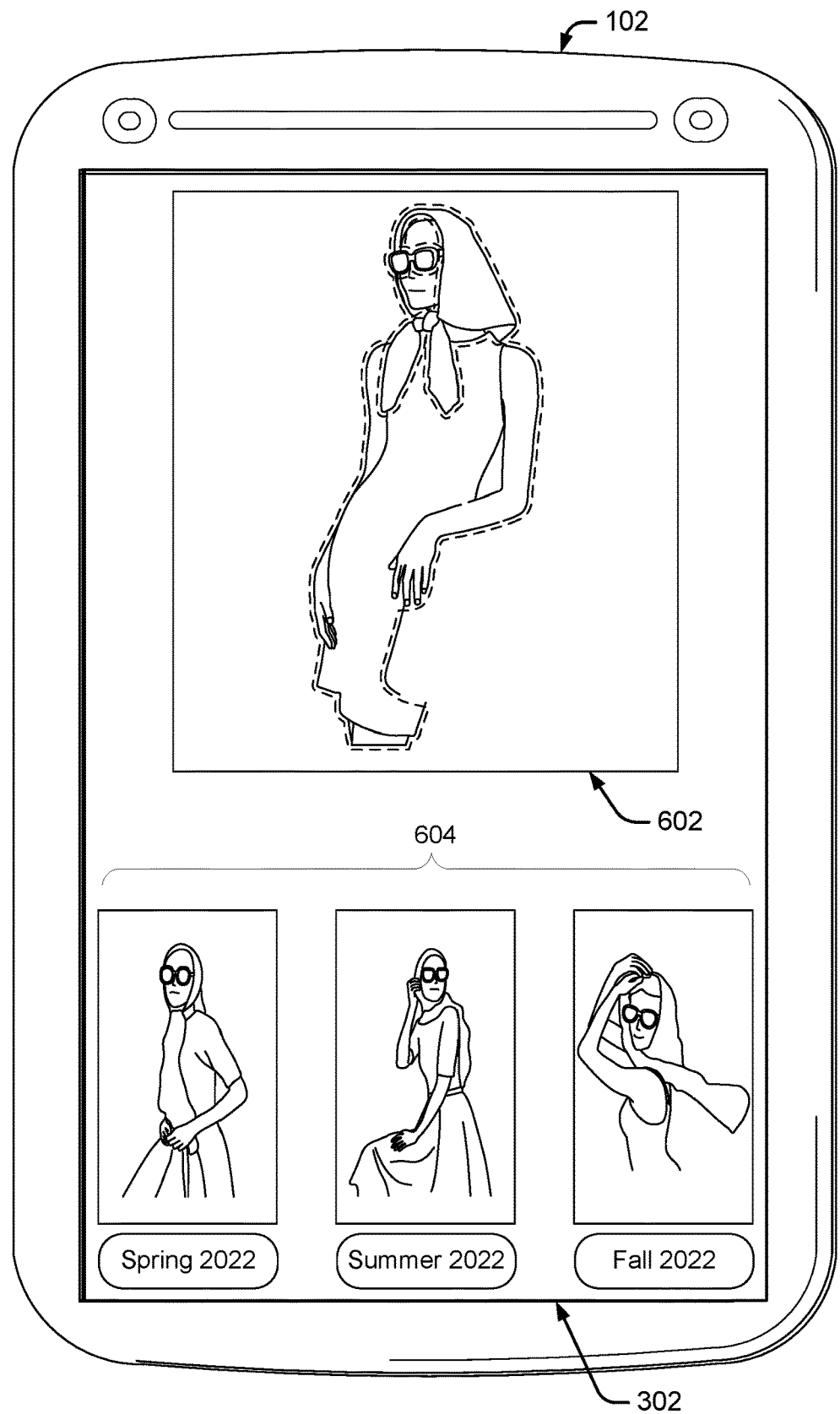

FIG. 6 shows an example where a query image 602 is derived from the input image using the masks. Said another way, the query image is a composite image created from the masks of the selected objects. The query image is shown with dotted lines to Illustrate which portions of the input image are used for the query. Note that the query image does not include the handbag, because the handbag was not one of the objects that was selected by the user.

Next, the search engine performs a search of the index of searchable images using the query image. The search engine retrieves different images as search results and sends them to the client device 102 over the network. The local search application shows the image search results 604 as shown in FIG. 6. In this case, each of the search results includes a fashion model with a scarf and glasses, but no handbag. Thus, the search results are more focused on the specific objects of interest to the user (fashion model, glasses, and scarf) than was the case when the entire input image was used as the query image. Said another way, by removing the handbag prior to querying the index, the search engine was able to retrieve a set of result images that are more relevant to the user's search intent.

Consider an alternative approach where the user attempted to crop the image to remove the handbag. Some cropping tools are limited to specific shapes (e.g., rectangles), and it would be quite difficult for the user to draw a rectangle that includes the fashion model, glasses, and scarf but excludes the handbag. Even assuming the use of a freehand cropping tool that allows the user to draw an outline of the objects they wish to select, it would still be difficult for a user to precisely crop out the specific portions of the input image that they are interested in. By using automatic object detection and allowing users to select two or more distinct objects from a given input image, the disclosed implementations facilitate searching for images of interest to the user without burdening the user with complex and time-consuming image cropping to express their search intent.

In addition, also note that the selected objects can be physically distant from one another. For instance, the user could have decided to select only the handbag 206 and the glasses 208, but not the fashion model 204 or the scarf 210. It would be quite difficult for the user to crop out the handbag and glasses without also cropping out parts of the fashion model and scarf, but the disclosed implementations allow the user to easily select two distinct objects that are physically separate with one another and that overlap with other non-selected objects in the input image. Thus, for instance, the user would be able to search for result images with similar handbags and glasses that might appear together with fashion models that look quite different than fashion model 204 and/or are not wearing scarves.

Second Example User Experience

Figure 7:
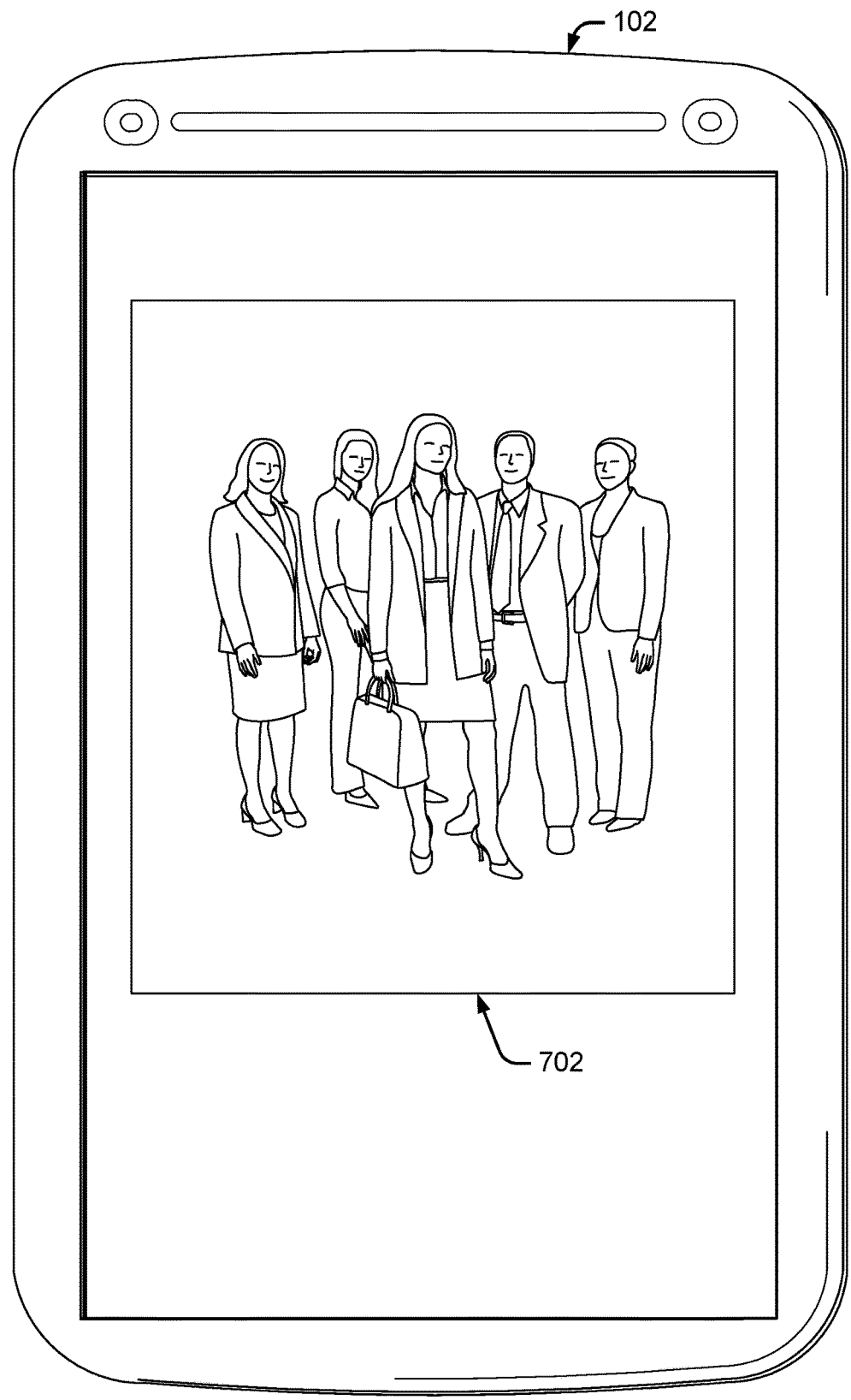

As shown in FIG. 7, assume that a user selects a different input image 702, which includes a group of people standing together in business attire. For the purposes of this example, assume that the user wishes to see pictures of males holding briefcases. However, note that the only person holding a briefcase in the input image is female. Thus, while the input image has the specific objects that the user is interested in (a briefcase and a male person), those objects are not physically arranged in a manner that matches the user's search intent. Nevertheless, the input image can be employed to conduct a search that more closely matches the user's intent using the techniques described below.

Figure 8:
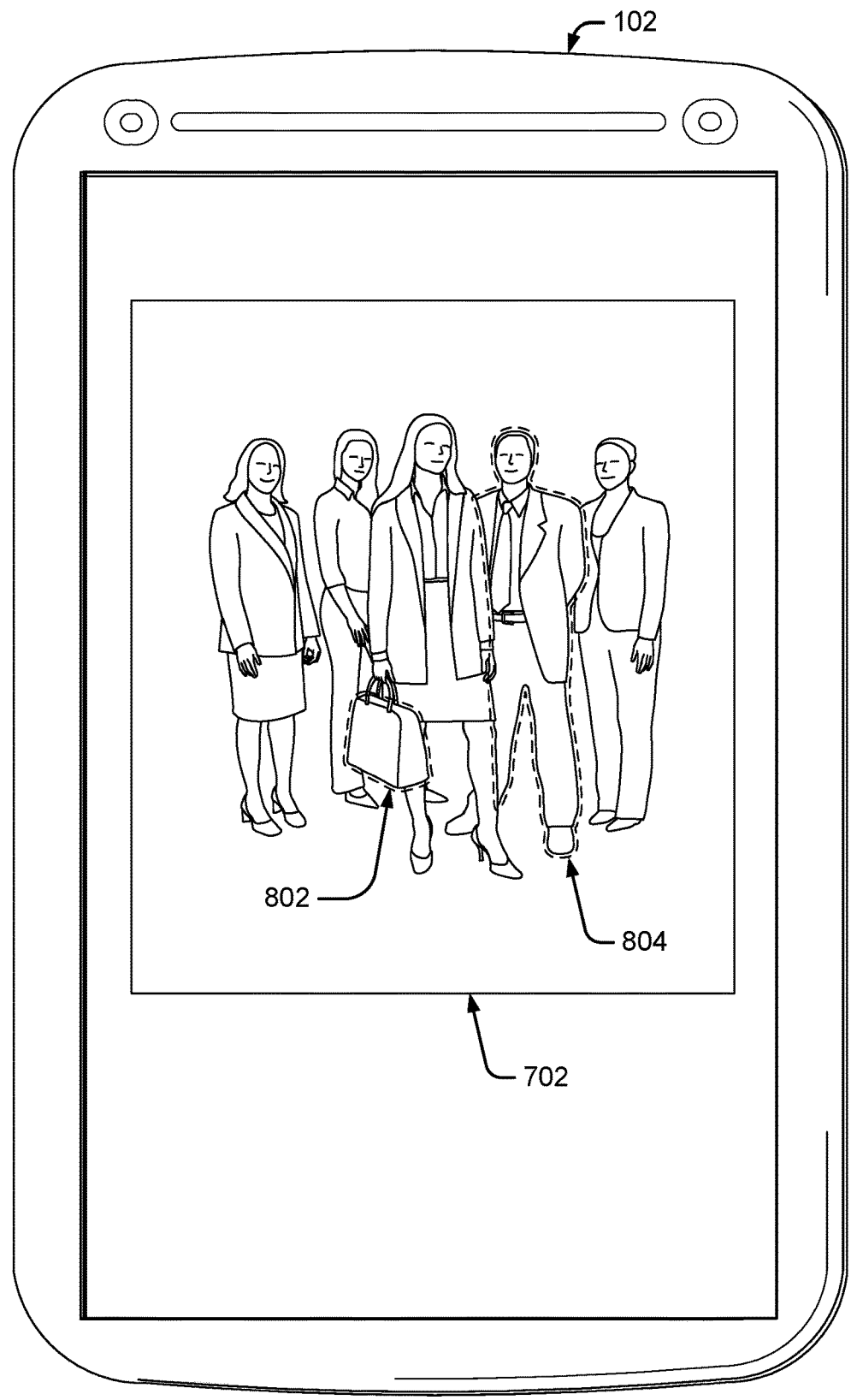
Figure 9:
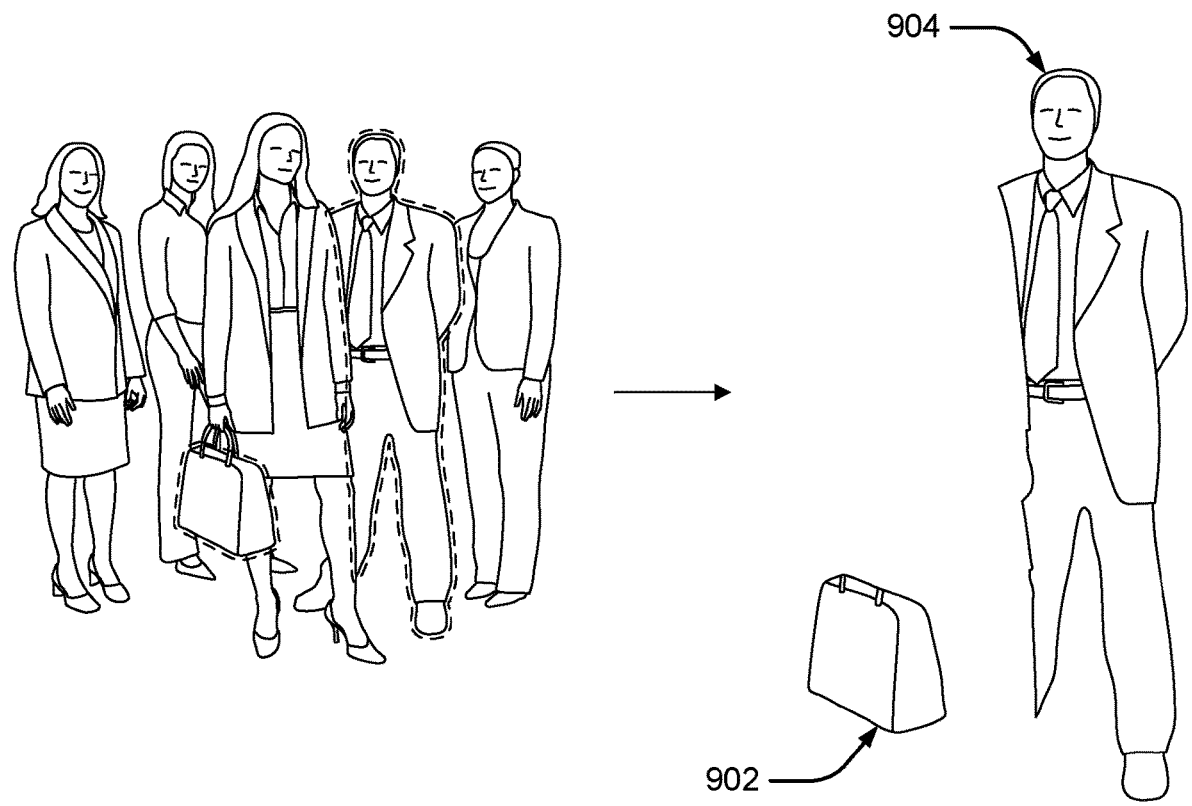

First, the local search application can send the input image 702 to the search engine for object detection and boundary identification as described previously. Next, as shown in FIG. 8, the user selects two objects—a briefcase 802 and a fashion model 804. The local search application can display boundaries of the selected objects to convey that these objects have been selected. As noted previously, the local search application can send identifiers of the selected objects back to the search engine, which can create masks for each selected object. For instance, as shown in FIG. 9, the selected objects are masked to create a first mask 902 of the briefcase and a second mask 904 of the fashion model.

Figure 10:
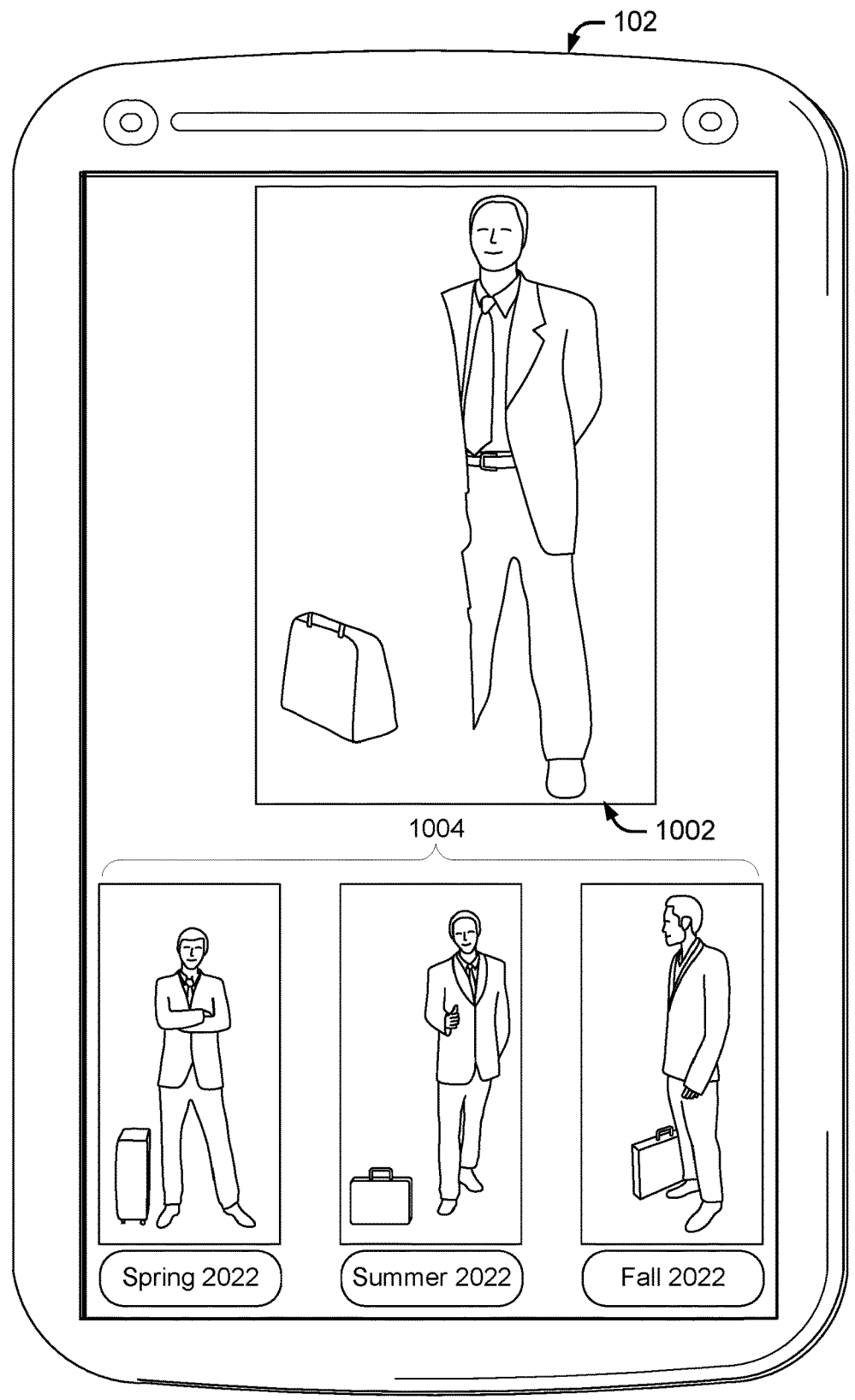

The masks can be combined by the search engine to generate a composite image 1002 as shown in FIG. 10. The search engine may perform a search of the index of searchable images using the composite image a query image. The search engine can obtain image search results and send the image search results to the client device 102 over a network. The local search application can output the results as image search results 1004, which include images of males with briefcases on the floor next to them. However, as noted above, the user would prefer to find images of males holding briefcases in their hand. Because the composite image used to query the index did not convey this physical relationship between the male person and the briefcase, the image search results are not fully responsive to the user's search intent.

Figure 11:
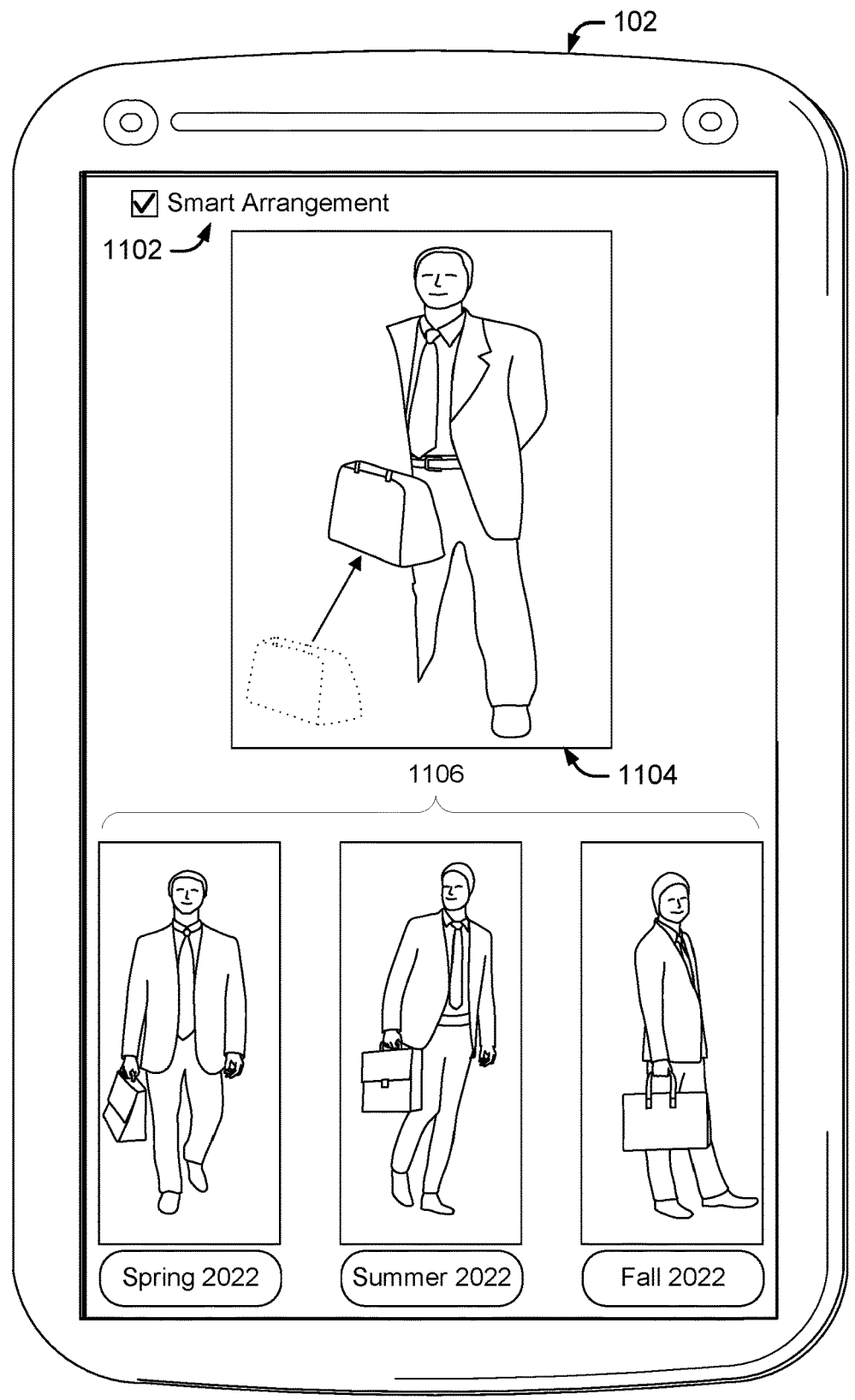

FIG. 11 shows an example where the user is given an opportunity to select a smart arrangement icon 1102 prior to executing the query. When the user selects the smart arrangement icon, the local search application can send a corresponding rearrangement request to the search engine. The search engine can then adjust the relative positions of the briefcase and hand by moving the briefcase closer to the hand of the fashion model, resulting in adjusted composite image 1104.

The search engine can use the adjusted composite image 1104 as a query image to search the index and return search results to the local search application. The local search application can display the adjusted composite image 1104, which include images of males holding briefcases. Thus, by adjusting the relative positioning of the selected objects, the search results not only focus on the specific subset of objects that the user is interested in, but the search results also convey the physical relationship between those objects as desired by the user.

In some cases, object rearrangement can be done manually instead of automatically. For instance, the user can select and drag one object (e.g., the briefcase) closer to another object (e.g., the user's hand). Again, the result will be a composite image with objects of interest to the user that have been rearranged in a manner that reflects the user's search intent more accurately than the original input image. As a consequence, the search results identified by the search engine are likely to be more relevant to user's search intent than the original input image or the composite image prior to the object rearrangement.

Object Detection and Segmentation Algorithms

As noted previously, some implementations can involve the search engine automatically detecting objects within a given input image. Object detection can involve classifying objects (e.g., by assigning semantic labels) and identifying boundaries of individual objects within a given input image. One specific technique for detecting object boundaries is outlined below.

In circumstances where the input image is stored by the search engine, the search engine can preprocess the input image before the user identifies the input image for use in a query. However, when users upload input images from local storage on a remote client device, the search engine may not have an opportunity to preprocess the image. Thus, it can be useful to employ an object detection technique that is relatively fast, so that the user does not perceive high latency after sending the input image to the search engine. On the other hand, image search techniques are not overly sensitive to the accuracy of object boundaries. Thus, even if the object boundaries for a given input image are not perfectly accurate, the user is likely to receive search results that accurately reflect the intent of the user. As a consequence, the disclosed implementations can employ a relatively fast object detection model that may give up some accuracy in favor of low latency.

One algorithm that satisfies these design considerations involves generating object proposals and detecting objects based on a Faster-RCNN (ResNet-101) model (Ren et al., "Faster r-cnn: Towards Real-Time Object Detection with Region Proposal Networks." Advances in Neural Information Processing Systems 28 (2015). Such an object detection model can be trained on the Open Images dataset, (Kuznetsova et al., "The Open Images Dataset v4, Unified Image Classification, Object Detection, and Visual Relationship Detection at Scale," International Journal of Computer Vision, 128(7), pp. 1956-1981) which is a dataset of training images that are annotated with labels of class names for objects in the images. Such a model be employed at inference time to generate object boundaries and corresponding tag vectors for input images. For each detected object in a given input image, the object detection model can generate 3 outputs: a bounding box (bbox), a confidence score, and a label vector.

The bounding boxes can then be employed to extract image masks for each object in the input image. For instance, foreground objects can be segmented from each bounding box, e.g., using the Faster-RCNN model. The segmented foreground objects can be retained while a remainder of the image can be modified (e.g., to a pixel intensity value of zero) to generate the respective object masks for each object in the input image.

Object Position Adjustment Algorithms

As noted previously, some implementations involve the search engine automatically adjusting the relative positioning of selected objects to obtain a query image. One way to determine the positioning involves calculating an association score between the selected objects. Along with association score, an adjusted location $Adj(x, y)$ can be generated, which indicates where one object will be repositioned. To generate the association score and adjusted location, a deep neural network model can be trained, e.g., using the Open Images Dataset, which has approximately 9 million images with object labelling and bounding boxes.

The association score of one selected object with respect to another selected object in a given input image can be generated. If the association score between any two selected objects exceeds a threshold, the selected objects can be brought closer together using an Adjusted location Adj(x, y). Then, a query image can be derived using object masks of the repositioned objects. If the association score between any two selected objects does not exceed the threshold, the selected objects are not adjusted, e.g., they retain their original positioning from the input image.

To find the association score and the adjusted location for a given pair of selected objects, a single Convolution network based on the YOLO architecture (Redmon et al., "You Only Look Once: Unified, Real-Time Object Detection," In Proceedings of the IEEE Conference on Computer Vision and Pattern Recognition 2016 (pp. 779-788)) can be provided with a modified output layer to generate an association score between the selected objects, as well as an adjusted Location, Adj(x, y). Some implementations add another automatic label for the association score based on how close two labelled objects are within an image.

The training dataset can include values Adj(x, y) which indicate the position where an object B lies in the bounding box of another object A.

```
AssociationScore [label – i, label – j]
    : Normalized {(eucl – dist (center – i, center
    – j))} for all dataset [1..N]
Adj[label – i, label – j](x, y)
    = Center(BoundingBox[label – i])
    – BoundingBox[label – j].TopLeft
```

The model can be trained using the training dataset to predict the association scores and adjusted locations calculated using the formulas above over the entire training dataset.

Once trained, when a new image is passed to the model, the model generates both an association score value for any two objects (i, j) in the image as well an adjusted position(x, y). This score can then be used to bring two objects closer based on Adj(x, y) or kept at distance for subsequent generation of a query image using object masks for the objects. Thus, the model can learn to reposition objects having particular labels in a given input image based on how closely other objects with the same labels tend to appear in the training dataset.

For instance, if a user inputs an image with a dog far apart from a leash, and the training dataset includes primarily images of dogs with leashes nearby, the trained model will tend to output relatively high association scores, and adjusting the location of the dog and leash in the input image will tend to move them closer together. Conversely, if the user inputs an image with a dog laying next to a cat and the training dataset includes primarily images of dogs relatively far away from cats, the trained model will tend to output relatively low association scores for dogs and cats, and either the dog and cat in the input image will either not be adjusted or they will be moved further apart from one another.

Example System

Figure 12:
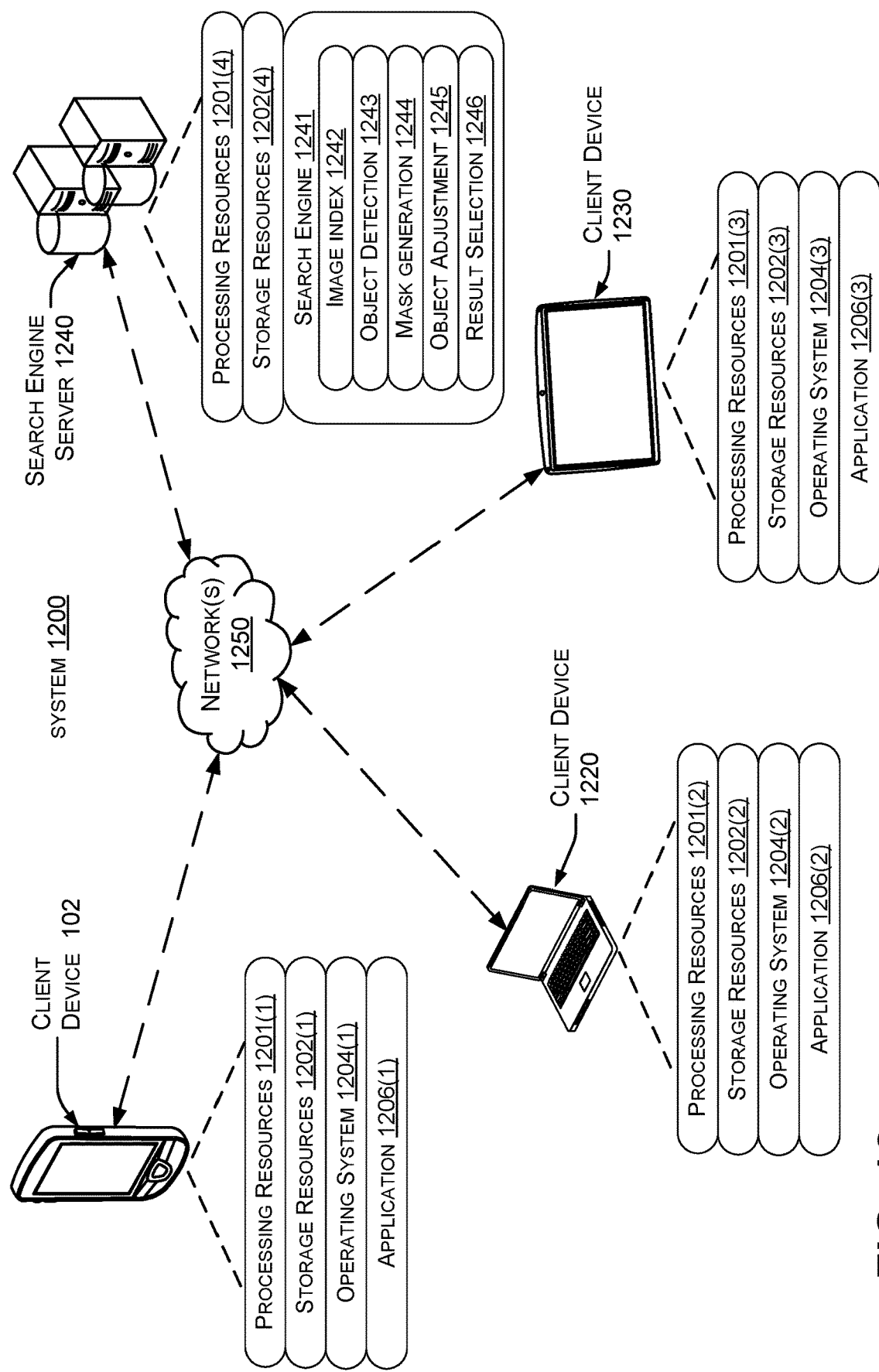
FIG. 12 illustrates an example system that is consistent with some implementations of the present concepts.

The present implementations can be performed in various scenarios on various devices. FIG. 12 shows an example system 1200 in which the present implementations can be employed, as discussed more below.

As shown in FIG. 12, system 1200 includes client device 102, a client device 1220, a client device 1230, and a search engine server 1240, connected by one or more network(s) 1250. Note that the client devices can be embodied both as mobile devices such as smart phones and/or tablets, as well as stationary devices such as desktops, server devices, etc. Likewise, the servers can be implemented using various types of computing devices. In some cases, any of the devices shown in FIG. 12, but particularly the servers, can be implemented in data centers, server farms, etc.

Certain components of the devices shown in FIG. 12 may be referred to herein by parenthetical reference numbers. For the purposes of the following description, the parenthetical (1) indicates an occurrence of a given component on client device 102, (2) indicates an occurrence of a given component on client device 1220, (3) indicates an occurrence of a given component on client device 1230, and (4) indicates an occurrence of a given component on search engine server 1240. Unless identifying a specific instance of a given component, this document will refer generally to the components without the parenthetical.

Generally, the devices 102, 1220, 1230, and/or 1240 may have respective processing resources 1201 and storage resources 1202, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Search engine server 1240 can include a search engine 1241 that includes an image index 1242, an object detection module 1243, a mask generation module 1244, an object adjustment module 1245, and a result selection module 1246. The image index can include various searchable images that have been indexed according to contents of each image. For instance, in some cases each image is represented as a vector embedding that is generated by inputting the searchable image into a deep neural network that outputs the vector embedding.

Object detection module 1243 can detect objects in an input image as described previously. User input selecting individual objects can be received from one of the client devices, e.g., using a hit test performed to see whether a given input falls within the boundary of a given object. Once a subset of objects in a given input image has been selected, mask generation 1244 can mask the selected objects by retaining pixel values within the object boundaries and modifying pixel values (e.g., to zero intensity) outside of the object boundaries. Object adjustment module 1245 can manually or automatically adjust the physical relationship between the selected objects. As described previously, automatic adjustment can involve computing association scores and adjusted locations between any two selected objects, whereas manual adjustment can involve users dragging a selected object to a different location within a given input image.

Result selection module 1246 can query the index using a query image derived from the image. The query image can be a composite image derived from the image masks for each selected object, potentially as adjusted by the object adjustment module. The query image can be mapped into an embedding using the same model that was employed to map the searchable images to generate the image index. The query image embedding can be compared to respective embeddings of the searchable images to select a subset of the searchable images as search results. For instance, some implementations can select a specific number (e.g., 10) of searchable images having corresponding embeddings that are closest in the vector space to the query image embedding.

Client devices 102, 1220, and 1230 can each include respective instances of an operating system 1204 and an application 1206. Application 1206 can be a dedicated search application, a web browser, etc. The operating system and/or application can depict user interfaces as described previously with respect to FIGS. 1-4, 6-8, 10, and 11. In some cases, the operating system and/or application on a given client device can receive user input, such as input selecting a given input image, selecting objects within a given input image, and/or input requesting automatic or manual rearrangement of selected objects. The operating system and/or application can also perform functionality such as hit testing individual pixels of a given image to determine which object in the image that a given input is directed to, e.g., based on object boundaries provided by the search engine.

First Example Method

Figure 13:
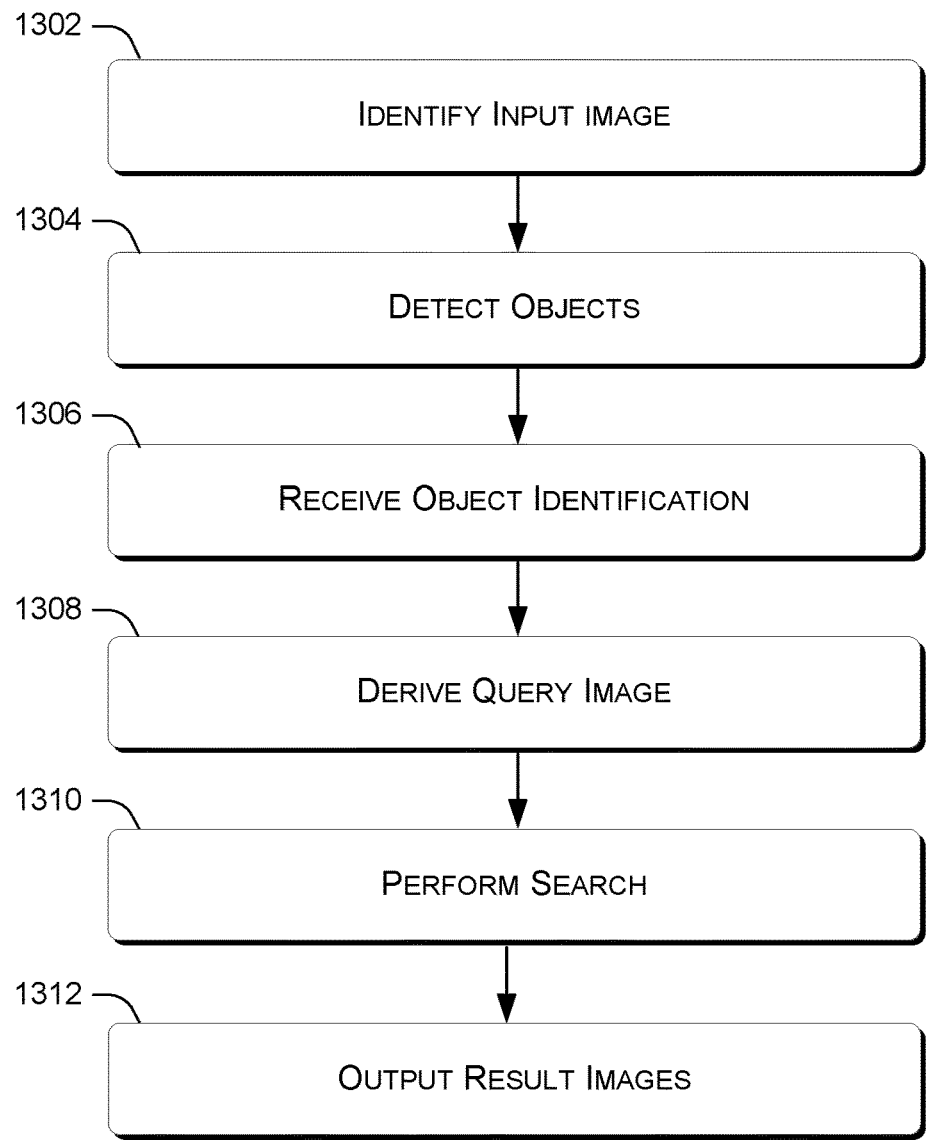
FIGS. 13-15 illustrate examples of methods or techniques that are consistent with some implementations of the present concepts.

The following discussion presents an overview of functionality that can be employed to search for images. FIG. 13 illustrates an example method 1300, consistent with the present concepts. Method 1300 can be implemented by a single device, e.g., search engine server 1240, or can be distributed over one or more servers, client devices, etc. Moreover, method 1300 can be performed by one or more modules, such as search engine 1241.

At block 1302, an input image is identified. For instance, the input image can be identified by receiving the input image over a network from a client device. As another example, the input image can be identified based on user input selecting the input image from a web page having multiple images available for selection by the user.

At block 1304, two or more objects are detected in the input image. As noted above, some implementations can employ a machine learning approach that uses a model such as a deep neural network to detect the objects. In some cases, another model, such as another DNN, is employed to segment the objects from a background of the input image.

At block 1306, identification of two or more selected objects from the input image is received. For instance, a user can employ a mouse input or touch input to select two or more of the objects in the input image. In some cases, the input image is modified to convey which objects have been selected, as described above. In some cases, the input is provided by a user to a client device displaying the input image, and then the client device can employ a hit test to determine which objects have been selected. Then, the client device can send identifiers of the selected objects to the search engine.

At block 1308, a query image is derived from the input image. The query image can include the selected objects. In some cases, the search engine can generate the query image as a composite image derived from image masks of each of the selected objects. The query image can omit other objects in the input image that were not selected by the user.

At block 1310, a search can be performed using the query image to identify result images. For instance, in some cases, the query image can be mapped to a query image embedding in a vector space, e.g., using a deep neural network. The query image embedding can be compared to corresponding search image embeddings in a search engine index. Individual search images can be selected based on similarity of their respective embeddings to the query image embedding. For instance, the similarity can be determined based on a distance between the embeddings in a vector space.

At block 1312, the result images can be output. In some cases, the result images are output by sending the result images themselves over a network to the client device from which the input image was received and/or identified. The result images can also be ranked according to one or more criteria, e.g., their relative similarity to the query image, frequency with which they are selected by other users, etc.

Second Example Method

Figure 14:
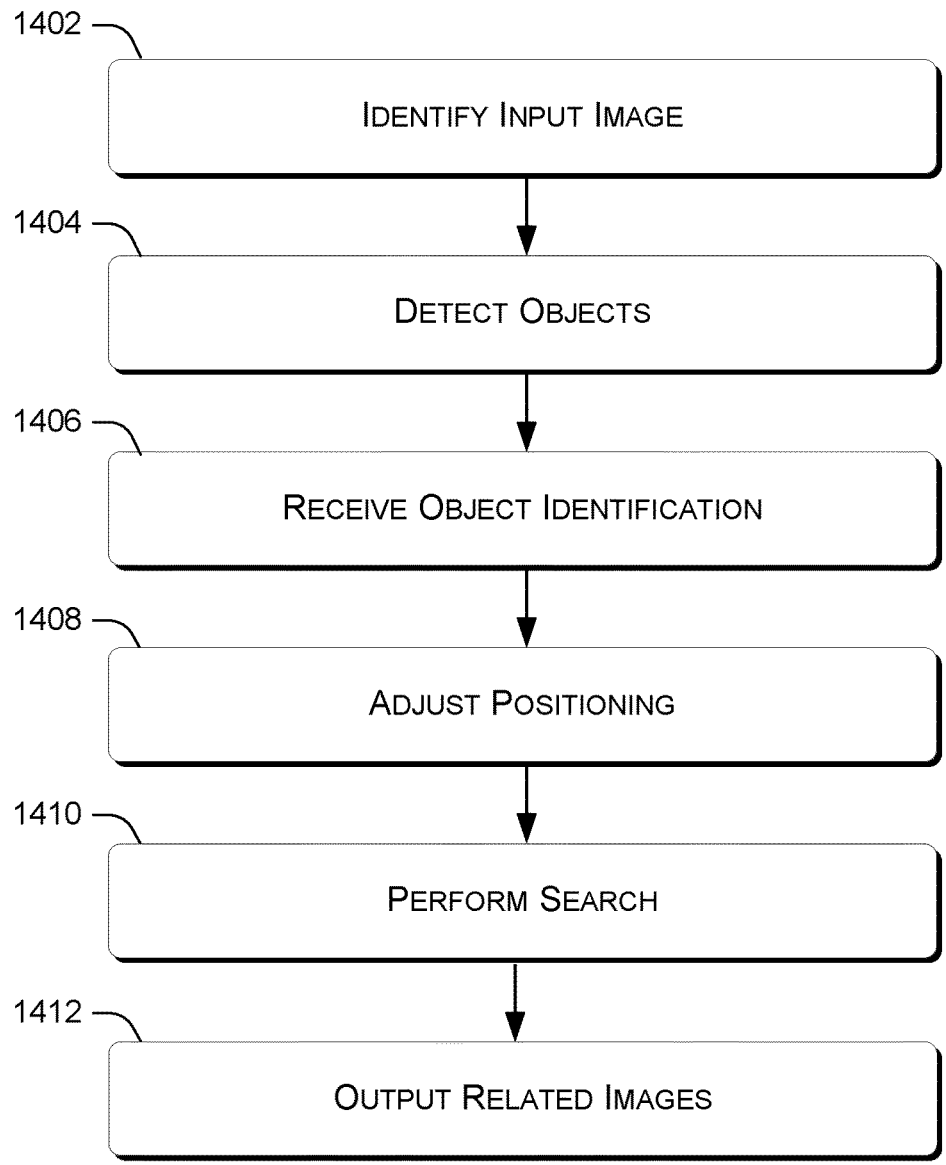

The following discussion presents an overview of functionality that can be employed to search for images. FIG. 14 illustrates an example method 1400, consistent with the present concepts. Method 1400 can be implemented by a single device, e.g., search engine server 1240, or can be distributed over one or more servers, client devices, etc. Moreover, method 1400 can be performed by one or more modules, such as search engine 1241.

At block 1402, an input image is identified. As noted above, the input image can be identified by receiving the input image over a network from a client device, or identified based on user input selecting the input image from a web page having multiple images available for selection by the user.

At block 1404, two or more objects are detected in the input image. As noted previously, one or more machine learning models can be employed to detect boundaries of the objects as well as to segment the objects from a background of the input image.

At block 1406, identification of a first selected object and a second selected object is received. As noted previously, a user can employ a mouse input or touch input to select two or more of the objects in the input image. In some cases, the input image is modified to convey which objects have been selected, as described above. In some cases, the input is provided by a user to a client device displaying the input image, and then the client device can employ a hit test to determine which objects have been selected. Then, the client device can send identifiers of the selected objects to the search engine.

At block 1408, positioning of the first and second selected objects is adjusted to derive a query image. As noted previously, the positioning can be adjusted manually in response to user input, or automatically based on an association score.

At block 1410, a search can be performed using the query image. The search can identify result images based on similarity of the result images to the query image. As noted previously, similarity can be determined using image embeddings obtained by mapping the query image and the result images into a vector space using a deep neural network or other machine learning model.

At block 1412, the result images can be output. As noted previously, the result images can be output by sending the result images over a network to a client device. The result images can also be ranked according to one or more criteria.

Third Example Method

Figure 15:
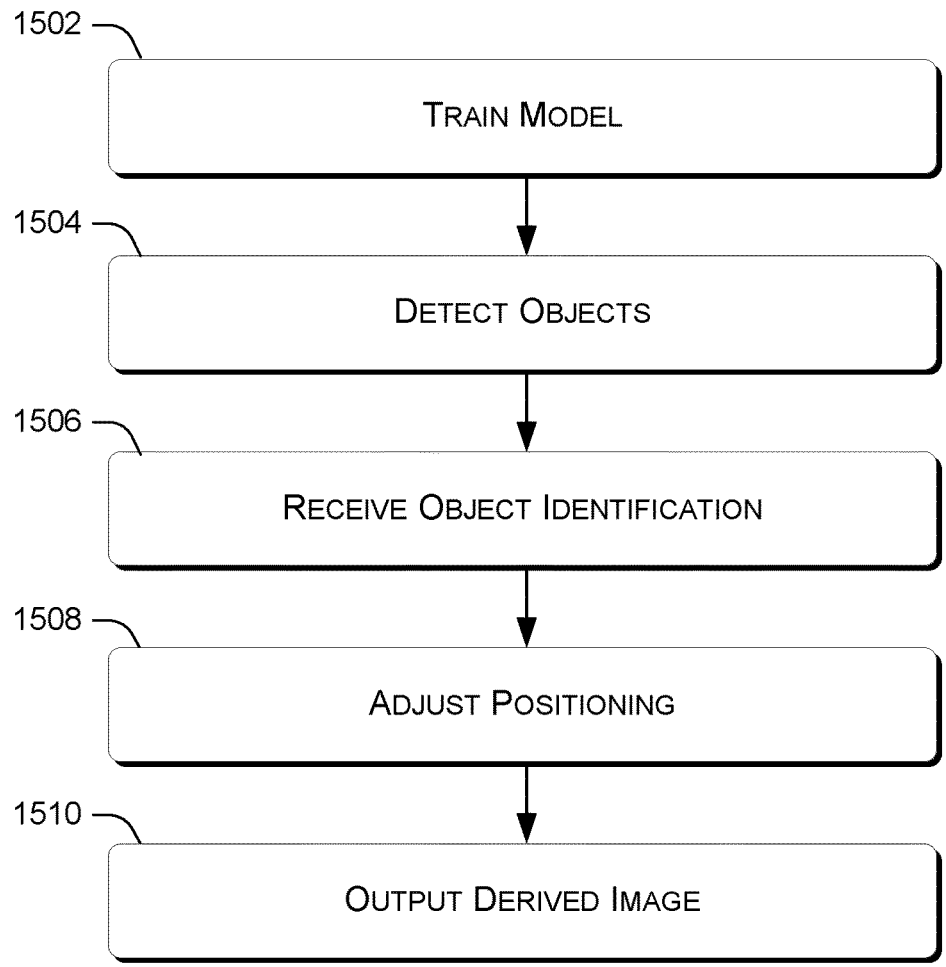

The following discussion presents an overview of functionality that can be employed to adjust the location of objects in a given image. FIG. 15 illustrates an example method 1500, consistent with the present concepts. Method 1500 can be implemented by a single device, e.g., search engine server 1240, or can be distributed over one or more servers, client devices, etc. Moreover, method 1500 can be performed by one or more modules, such as search engine 1241.

At block 1502, a model is trained using a training dataset to predict association scores and adjusted locations for objects. For instance, the training dataset can include a number of images with labeled objects. For each pair of labels, association scores and adjusted locations can be calculated over all of the images in the training dataset, and the model can be trained to predict those values.

At block 1504, two or more objects are detected in an input image. As noted previously, one or more machine learning models can be employed to detect boundaries of the objects as well as to segment the objects from a background of the input image.

At block 1506, identification of a first selected object and a second selected object is received. As noted previously, a user can employ a mouse input or touch input to select two or more of the objects in the input image. The input image can be modified to convey which objects have been selected, as described above. In some cases, the input is provided by a user to a client device displaying the input image, and then the client device can employ a hit test to determine which objects have been selected. Then, the client device can send identifiers of the selected objects to the search engine.

At block 1508, positioning of the first and second selected objects is adjusted to derive another image. As noted previously, the positioning can be adjusted by using the trained model to determine an association score and an adjusted location for the first and second selected object.

At block 1510, the derived image can be output. For instance, as noted above, the derived image can be output as a query to perform an image search. As another example, the derived image can be output by displaying the derived image to a user, or adding the derived image to an image database for subsequent retrieval. In some cases, the derived image can replace the original input image, e.g., on a web page, in a search index, etc.

Technical Effect

As noted previously, conventional image search techniques tend to use the entirety of an input image as a query. Users who are interested in only a subset of objects in a given input image have relatively crude tools available to modify the input image. For instance, traditional image cropping tools tend to result in poorly-edited query images that return search results that may not match the desired user intent.

The disclosed implementations offer improved image searching techniques by using automated object detection to identify specific objects in a given image. Users can then select a subset of the identified objects, which are then used to derive a query image from the input image. Because the query image lacks one or more objects from the input image that the user may not be interested in, the image search results are less likely to include objects that are similar to those that the user lacks interest in. Instead, the image search results are likely to include more relevant results for the user, e.g., focused on the objects that the user has selected.

As noted previously, some implementations can maintain a data structure such as an index of search images. The search images and the query can be mapped into embeddings in a vector space. Because the query image more accurately represents the user's intent than the original input image, the embedding of the query image will tend to be closer in the vector space to those search images that have objects of interest to the user. Said another way, removing unwanted objects from the input image prior to generating the embedding has the technical effect of producing a resulting embedding that, when compared to the embeddings in the search index, tends to return images that emphasize the objects of interest to the user while deemphasizing other search images that may have other objects similar to those in the original input image that the user is not particularly interested in.

Device Implementations

As noted above with respect to FIG. 12, system 1200 includes several devices, including client devices 102, 1220, and 1230 as well as search engine server 1240. As also noted, not all device implementations can be illustrated, and other device implementations should be apparent to the skilled artisan from the description above and below.

The term "device", "computer," "computing device," "client device," "server," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FP- GAs), Application-specific Integrated Circuits (ASICs), Application-specific Standard Products (ASSPs). System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, touchscreens, voice recognition, gesture recognition (e.g., using depth cameras such as stereoscopic or time-of-flight camera systems, infrared camera systems. RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices that communicate over network(s) 1250. Without limitation, network(s) 1250 can include one or more local area networks (LANs), wide area networks (WANs), the Internet, and the like.

Various examples are described above. Additional examples are described below. One example includes a method performed on a computing device, the method comprising identifying an input image, detecting a plurality of objects in the input image, receiving identification of two or more selected objects from the plurality of objects in the input image, deriving a query image from the input image, the query image including the two or more selected objects, performing a search using the query image, the search identifying result images based at least on similarity to the query image, and outputting the result images in response to the query image.

Another example can include any of the above and/or below examples where performing the search comprises mapping the query image to a query image embedding representing the query image and searching an index of searchable images to identify the result images based at least on similarity of the query image embedding to respective embeddings of the searchable images.

Another example can include any of the above and/or below examples where detecting the plurality of objects comprises detecting boundaries of the objects.

Another example can include any of the above and/or below examples where deriving the query image comprises creating two or more object masks for the two or more selected objects based at least on respective boundaries of the two or more selected objects.

Another example can include any of the above and/or below examples where deriving the query image comprises generating a composite image using the two or more object masks.

Another example can include any of the above and/or below examples where the method further comprising detecting a hover input over a particular object, causing a particular boundary of the particular object to be displayed responsive detecting to the hover input over the particular object, and while the particular boundary of the particular object is displayed, receiving a selection input designating the particular object as one of the two or more selected objects.

Another example can include any of the above and/or below examples where the selection input is received via a mouse device or a touchscreen.

Another example includes a method performed on a computing device, the method comprising identifying an input image, detecting a plurality of objects in the input image, receiving identification of a first selected object from the input image and a second selected object from the input image, adjusting relative positioning of the first selected object and the second selected object, the adjusting resulting in a query image, performing a search using the query image, the search identifying result images based at least on similarity to the query image, and outputting the result images in response to the query image.

Another example can include any of the above and/or below examples where the adjusting is performed responsive to user input moving the first selected object.

Another example can include any of the above and/or below examples where the adjusting is performed automatically.

Another example can include any of the above and/or below examples where the adjusting is performed based at least on an association score of the first selected object and the second selected object.

Another example can include any of the above and/or below examples where the adjusting is performed using a model trained based on distances between labeled objects in a training data set.

Another example can include any of the above and/or below examples where the method further comprises training the model.

Another example can include any of the above and/or below examples where performing the search comprises mapping the query image to a query image embedding representing the query image and searching an index of searchable images to identify the result images based at least on similarity of the query image embedding to respective embeddings of the searchable images.

Another example can include any of the above and/or below examples where the method further comprises creating a first object mask for the first selected object and a second object mask for the second selected object and generating the query image with the first object mask and the second object mask according to the adjusted relative positioning.

Another example includes a system comprising a hardware processing unit and a storage resource storing computer-readable instructions which, when executed by the hardware processing unit, cause the system to implement a search engine configured to: maintain an index of searchable images, receive identification of two or more selected objects from an input image, derive a query image from the input image, the query image including the two or more selected objects, based at least on the query image, search the index to identify result images, and output the result images in response to the query image.

Another example can include any of the above and/or below examples where the index comprises embeddings representing the searchable images in a vector space, and the search involves representing the query image in the vector space and identifying the result images based at least on proximity to the query image in the vector space.

Another example can include any of the above and/or below examples where the query image comprises a composite image that includes respective masks of the two or more selected objects.

Another example can include any of the above and/or below examples where the search engine is configured to automatically identify object boundaries of multiple objects in the query image and output the object boundaries, wherein the identification of the two or more selected objects is based at least on user selection inputs within respective object boundaries of the two or more selected objects.

Another example can include any of the above and/or below examples where the search engine is configured to cause individual object boundaries to be displayed in response to hover inputs over individual objects.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   detecting a plurality of objects in an input image;
   receiving identification of two or more selected objects from the plurality of objects in the input image;
   deriving a query image from the input image based at least on respective object masks of the two or more selected objects, the query image including the two or more selected objects;
   performing a search using the query image, the search identifying result images based at least on similarity to the query image; and
   outputting the result images in response to the query image.

2. The method of claim 1, wherein performing the search comprises:
   mapping the query image to a query image embedding representing the query image; and
   searching an index of searchable images to identify the result images based at least on similarity of the query image embedding to respective embeddings of the searchable images.

3. The method of claim 1, wherein detecting the plurality of objects comprises detecting boundaries of the objects.

4. The method of claim 3, wherein deriving the query image comprises creating the respective object masks for the two or more selected objects based at least on respective boundaries of the two or more selected objects.

5. The method of claim 4, wherein deriving the query image comprises generating a composite image using the respective object masks.

6. The method of claim 3, further comprising:
   detecting a hover input over a particular object;
   causing a particular boundary of the particular object to be displayed responsive detecting to the hover input over the particular object; and
   while the particular boundary of the particular object is displayed, receiving a selection input designating the particular object as one of the two or more selected objects.

7. The method of claim 6, wherein the selection input is received via a mouse device or a touchscreen.

8. The method of claim 1, wherein the query image lacks at least one non-selected object from the plurality of objects detected in the input image.

9. A method performed on a computing device, the method comprising:
   detecting a plurality of objects in an input image;
   receiving identification of a first selected object from the input image and a second selected object from the input image;
   adjusting relative positioning of the first selected object and the second selected object, the adjusting resulting in a query image;
   performing a search using the query image, the search identifying result images based at least on similarity to the query image; and
   outputting the result images in response to the query image.

10. The method of claim 9, wherein the adjusting is performed responsive to user input moving the first selected object.

11. The method of claim 9, wherein the adjusting is performed automatically.

12. The method of claim 11, wherein the adjusting is performed based at least on an association score of the first selected object and the second selected object.

13. The method of claim 12, wherein the adjusting is performed using a model trained based on distances between labeled objects in a training data set.

14. The method of claim 13, further comprising training the model.

15. The method of claim 9, wherein performing the search comprises:
   mapping the query image to a query image embedding representing the query image; and
   searching an index of searchable images to identify the result images based at least on similarity of the query image embedding to respective embeddings of the searchable images.

16. The method of claim 15, further comprising:
   creating a first object mask for the first selected object and a second object mask for the second selected object; and
   generating the query image with the first object mask and the second object mask according to the adjusted relative positioning.

17. A system comprising:
   a hardware processor; and
   a storage resource storing computer-readable instructions which, when executed by the hardware processor, cause the system to implement a search engine configured to:
   maintain an index of searchable images;
   receive identification of two or more selected objects from an input image, the identification being based at least on user selection inputs within respective object boundaries of the two or more objects;
   derive a query image from the input image, the query image including the two or more selected objects;
   based at least on the query image, search the index to identify result images; and
   output the result images in response to the query image.

18. The system of claim 17, wherein the index comprises embeddings representing the searchable images in a vector space, and the search involves representing the query image in the vector space and identifying the result images based at least on proximity to the query image in the vector space.

19. The system of claim 17, wherein the query image comprises a composite image that includes respective masks of the two or more selected objects.

20. The system of claim 17, wherein the search engine is configured to:

automatically identify object boundaries of multiple objects in the input image; and output the object boundaries.

21. The system of claim 20, wherein the search engine is configured to:

cause individual object boundaries to be displayed in response to hover inputs over individual objects.

* * * * *